United States Patent
Reial et al.

(10) Patent No.: US 10,952,258 B2
(45) Date of Patent: Mar. 16, 2021

(54) RANDOM ACCESS PREAMBLE SLOT ALLOCATION

(71) Applicant: Telefonaktiebolaget LM Ericsson (publ), Stockholm (SE)

(72) Inventors: Andres Reial, Malmö (SE); Henrik Sahlin, Mölnlycke (SE); Oskar Mauritz, Johanneshov (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 6 days.

(21) Appl. No.: 16/490,136

(22) PCT Filed: Dec. 20, 2017

(86) PCT No.: PCT/SE2017/051303
§ 371 (c)(1),
(2) Date: Aug. 30, 2019

(87) PCT Pub. No.: WO2018/160111
PCT Pub. Date: Sep. 7, 2018

(65) Prior Publication Data
US 2020/0015276 A1    Jan. 9, 2020

Related U.S. Application Data

(60) Provisional application No. 62/465,488, filed on Mar. 1, 2017.

(51) Int. Cl.
*H04W 74/08* (2009.01)
*H04W 72/04* (2009.01)

(52) U.S. Cl.
CPC ... *H04W 74/0833* (2013.01); *H04W 72/0446* (2013.01)

(58) Field of Classification Search
CPC .............. H04W 74/0833; H04W 72/0446
(Continued)

(56) References Cited

U.S. PATENT DOCUMENTS

2009/0175292 A1*  7/2009  Noh ............... H04W 74/0833
                                                        370/462
2010/0135274 A1*  6/2010  Hong .............. H04B 7/2656
                                                        370/345
(Continued)

FOREIGN PATENT DOCUMENTS

WO    2017017583 A1    2/2017

OTHER PUBLICATIONS

Unknown, Author, "Comparison of Formula for Restricted Cyclic shift Set", 3GPP TSG RAN WG1 Meeting #50, R1-073502, Athens, Greece, Aug. 22-24, 2007, pp. 1-6.
(Continued)

*Primary Examiner* — Peter G Solinsky
(74) *Attorney, Agent, or Firm* — Murphy, Bilak & Homiller, PLLC

(57) ABSTRACT

An example method for transmitting a random access preamble comprises selecting (502) a random access preamble configuration from a plurality of predetermined random access preamble configurations. The method further includes determining (504) a time interval in which to transmit the random access preamble. The method further comprises transmitting (506) the random access preamble according to the selected random access preamble configuration. Each of the plurality of random access preamble configurations comprises a combination of (a) a single root sequence from a predetermined set of one or more root sequences, (b) a single cyclic shift of a predetermined plurality of cyclic shifts for the root sequence, and (c) a single starting position of two or more predetermined start-
(Continued)

ing positions within time intervals allocated for random access preamble transmission.

20 Claims, 9 Drawing Sheets

(58) Field of Classification Search
USPC ......................................................... 370/329
See application file for complete search history.

(56) References Cited

U.S. PATENT DOCUMENTS

| | | | |
|---|---|---|---|
| 2014/0286261 A1* | 9/2014 | Vujcic | H04W 74/0833 370/329 |
| 2018/0145802 A1* | 5/2018 | Hwang | H04W 72/04 |
| 2019/0320430 A1* | 10/2019 | Kim | H04W 72/048 |
| 2019/0372696 A1* | 12/2019 | Park | H04L 5/0053 |
| 2020/0067690 A1* | 2/2020 | Park | H04L 5/0048 |

OTHER PUBLICATIONS

Unknown, Author, "NR PRACH preamble design", 3GPP TSG-RAN WG1 Meeting #86bis, R1-1609671, Lisbon, Portugal, Oct. 10-14, 2016, pp. 1-7.

Unknown, Abstract, "NR random access procedure", 3GPP TSG-RAN WG1 Meeting #86bis, R1-1609670, Lisbon, Portugal, Oct. 10-14, 2016, pp. 1-6.

* cited by examiner

RANDOM ACCESS PREAMBLE SLOT ALLOCATION

TECHNICAL FIELD

The present disclosure is generally related to random access techniques in wireless communications networks, and is more particularly related to techniques and devices for transmitting and detecting random access preambles.

BACKGROUND

The random access (RA) procedure is a key function in cellular communication systems. In the Long-Term Evolution (LTE) wireless communications system standardized by members of the $3^{rd}$-Generation Partnership Project (3GPP), a wireless device ("user equipment," or UE) that would like to access the network initiates the random access procedure by transmitting a preamble (Msg1) in the uplink, on the Physical Random Access Channel (PRACH). A base station, access node, or other transmission and receiving point (RTP) receives and detects the preamble and responds in the downlink by transmitting a random access response (RAR, or Msg2). The RAR carries an uplink scheduling grant for the wireless device, with which the wireless device continues the procedure by transmitting a subsequent message in the uplink (Msg3), for terminal identification.

A similar procedure is envisioned for the $5^{th}$-generation (5G) wireless network design that is currently under development, in which the radio access network (RAN) may be referred to, for example, as New Radio Access Technology, or simply "NR". FIG. 1 illustrates an example of the basic steps in the initial access procedure for NR, which includes a random access procedure.

As seen in FIG. 1, before transmission of the PRACH preamble, the UE receives one or several Synchronization Signals (SS), which may be referred to as or include, for example, a Primary Synchronization Signal (PSS), a Secondary Synchronization Signal (SSS), an NR-PSS, and/or a NR-SSS. The UE further receives various configuration parameters on one or more broadcast channels, which may be referred to as or include, for example, a Physical Broadcast Channel (PBCH) and/or NR-PBCH, possibly complemented with configuration parameters received on yet another channel.

A PRACH resource that is common for several SSs (NR-PSS and NR-SSS) has been defined, as described in the 3GPP document R1-1609670, "NR random access procedure," 3GPP TSG-RAN WG1 #86bis, Lisbon, Portugal, Sep. 10-14, 2016. FIG. 2 illustrates the relationship between the PRACH resource timing and SSs and/or the Master Information Blocks (MIBs). The timing from the SS to the PRACH resource (e.g., from a known reference point in the SS to the beginning of the time interval allocated to the PRACH resource) can be indicated in the MIB. Alternatively, this timing is conceivably in the SS itself or another related field, if another system information format should be agreed upon. Different SSs can then be used for different timings, such that the detected sequence within an SS gives the PRACH resource. This PRACH configuration might be specified as a timing relative to SS and PBCH, and can be given as a combination of the payload in the MIB and other broadcasted system information. As seen in FIG. 2, the proposed approach allows for dynamic timing between the SSs and time intervals allocated for the PRACH resource, i.e., the time intervals allocated for transmission of random access preambles. This flexible timing indication of the PRACH resource has lower resource overhead compared to using a fixed timing.

A PRACH preamble design is described in the 3GPP document R1-1609671, "NR PRACH preamble design," 3GPP TSG-RAN WG1 #86bis, Lisbon, Portugal, Sep. 10-14, 2016. This design is illustrated in FIG. 3, where the PRACH is shown along with a Physical Uplink Shared Channel (PUSCH). This PRACH format is based on repeating the same PRACH sequence, i.e., the same PRACH Orthogonal Frequency Division Multiplexing (OFDM) symbol, several times, without a cyclic prefix between the repetitions. Because the repeated symbols are the same, one PRACH OFDM symbol acts as a cyclic prefix for the next PRACH OFDM symbol.

For NR, an OFDM sub-carrier spacing of 15 kHz or 30 kHz is expected to be typically used, for carrier frequencies below 6 GHz. The small sub-carrier spacing formats can be used in larger cells as compared to larger sub-carrier spacing. The large sub-carrier spacing is suitable for time critical initial access, low latency data channels and high-speed scenarios.

NR is also expected to support PRACH preambles of different lengths. FIG. 4 illustrates six formats (x0 to x5) with different lengths of the PRACH preamble. The different formats can be used for different coverage situations, or for different receiver beamforming sweeps. The length of each format is changed depending on the sub-carrier spacing (SCS)—this rescaling of the PRACH preamble formats with respect to the sub-carrier spacing is also illustrated in FIG. 4. Here, a slot is used as the time unit on the horizontal axis, with 14 PUSCH OFDM symbols in each slot.

Further details of the random access procedure for NR, including further details of the random access preamble configuration, remain to be defined.

SUMMARY

Embodiments disclosed herein provide for an efficient configuration of short PRACH preamble formats, such as when the preamble length corresponds to only a fraction of a slot.

An example method for transmitting a random access preamble according to some of the embodiments described herein is implemented in a wireless device, such as a UE. This example method comprises selecting a random access preamble configuration from a plurality of predetermined random access preamble configurations. The method further includes determining a time interval in which to transmit the random access preamble. The method further comprises transmitting the random access preamble according to the selected random access preamble configuration. Each of the plurality of random access preamble configurations comprises a combination of (a) a single root sequence from a predetermined set of one or more root sequences, (b) a single cyclic shift of a predetermined plurality of cyclic shifts for the root sequence, and (c) a single starting position of two or more predetermined starting positions within each time interval allocated for random access preamble transmission.

In some embodiments, the plurality of predetermined random access preamble configurations is defined such that (i) the set of one or more root sequences consists of only a first root sequence, such that the plurality of predetermined random access preamble configurations consists of combinations of the first root sequence with various cyclic shifts and various starting positions, or (ii) the set of one or more root sequences comprises two or more root sequences, and the plurality of predetermined random access preamble configurations comprises all possible combinations of cyclic shifts and starting positions for at least one of the two or more root sequences.

Another example method, as implemented in a wireless device such as a base station, is for receiving and detecting a random access preamble. This example method includes receiving a signal comprising at least one random access preamble, in a time interval allocated for random access preamble transmission. The method further includes detecting the random access preamble by correlating the received signal with one or more random access preamble configurations from a plurality of predetermined random access preamble configurations and determining that a correlation peak resulting from said correlating meets a predetermined criterion. Finally, the method comprises transmitting a random access response message in response to said detecting.

In this example method, each of the plurality of random access preamble configurations comprises a combination of (a) a single root sequence from a predetermined set of one or more root sequences, (b) a single cyclic shift of a predetermined plurality of cyclic shifts for the root sequence, and (c) a single starting position of two or more predetermined starting positions within the time interval allocated for random access preamble transmission. In some embodiments, the plurality of predetermined random access preamble configurations is defined such that: (i) the set of one or more root sequences consists of only a first root sequence, such that the plurality of predetermined random access preamble configurations consists of combinations of the first root sequence with various cyclic shifts and various starting positions, or (ii) the set of one or more root sequences comprises two or more root sequences, and the plurality of predetermined random access preamble configurations comprises all possible combinations of cyclic shifts and starting positions for at least one of the two or more root sequences.

According to some embodiments, a wireless device includes a transceiver circuit and a processing circuit operatively coupled to the transceiver circuit. The processing circuit is configured to select a random access preamble configuration from a plurality of predetermined random access preamble configurations and determine a time interval in which to transmit the random access preamble. The processing circuit is also configured to transmit the random access preamble according to the selected random access preamble configuration. Each of the plurality of random access preamble configurations includes a combination of (a) a single root sequence from a predetermined set of one or more root sequences, (b) a single cyclic shift of a predetermined plurality of cyclic shifts for the root sequence, and (c) a single starting position of two or more predetermined starting positions within each time interval allocated for random access preamble transmission.

The plurality of predetermined random access preamble configurations may be defined such that: (i) the set of one or more root sequences consists of only a first root sequence, such that the plurality of predetermined random access preamble configurations consists of combinations of the first root sequence with various cyclic shifts and various starting positions, or (ii) the set of one or more root sequences comprises two or more root sequences, and the plurality of predetermined random access preamble configurations comprises all possible combinations of cyclic shifts and starting positions for at least one of the two or more root sequences.

According to some embodiments, a wireless device includes a transceiver circuit and a processing circuit operatively coupled to the transceiver circuit. The processing circuit is configured to receive a signal comprising at least one random access preamble in a time interval allocated for random access preamble transmission and detect the random access preamble by correlating the received signal with one or more random access preamble configurations from a plurality of predetermined random access preamble configurations and determining that a correlation peak resulting from the correlating meets a predetermined criterion. The processing circuit is also configured to transmit a random access response message in response to the detecting. Each of the plurality of random access preamble configurations includes a combination of (a) a single root sequence from a predetermined set of one or more root sequences, (b) a single cyclic shift of a predetermined plurality of cyclic shifts for the root sequence, and (c) a single starting position of two or more predetermined starting positions within the time interval allocated for random access preamble transmission.

The plurality of predetermined random access preamble configurations may be defined such that (i) the set of one or more root sequences consists of only a first root sequence, such that the plurality of predetermined random access preamble configurations consists of combinations of the first root sequence with various cyclic shifts and various starting positions, or (ii) the set of one or more root sequences comprises two or more root sequences, and the plurality of predetermined random access preamble configurations comprises all possible combinations of cyclic shifts and starting positions for at least one of the two or more root sequences.

Other embodiments detailed herein include wireless devices, such as UEs and base stations, configured and/or adapted to carry out one or several of the methods summarized above, or variants thereof, as well as corresponding functional implementations, computer program products and carriers of such computer program products.

DETAILED DESCRIPTION

Figure 1:
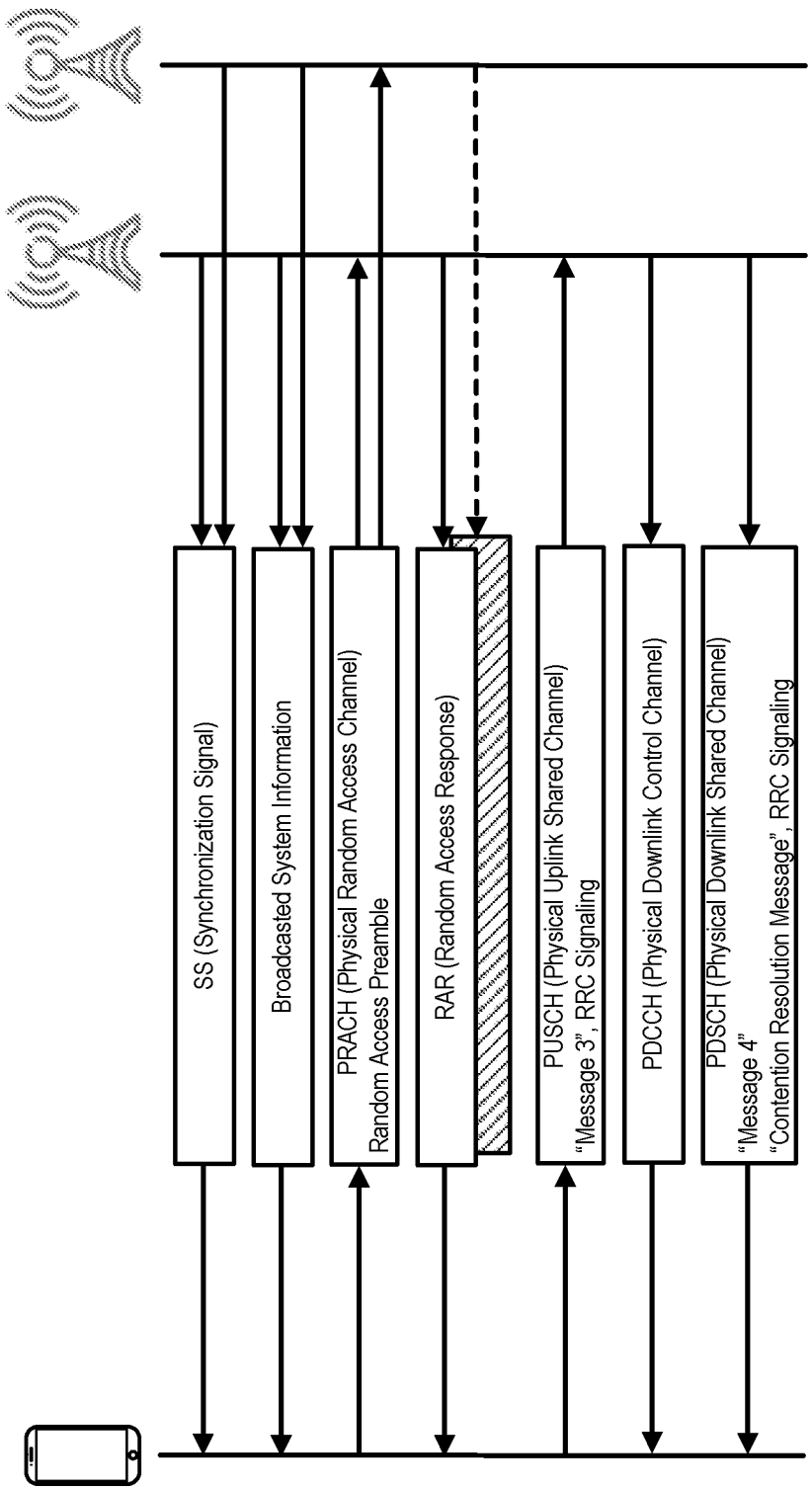
FIG. 1 illustrates an initial access procedure.
Figure 2:
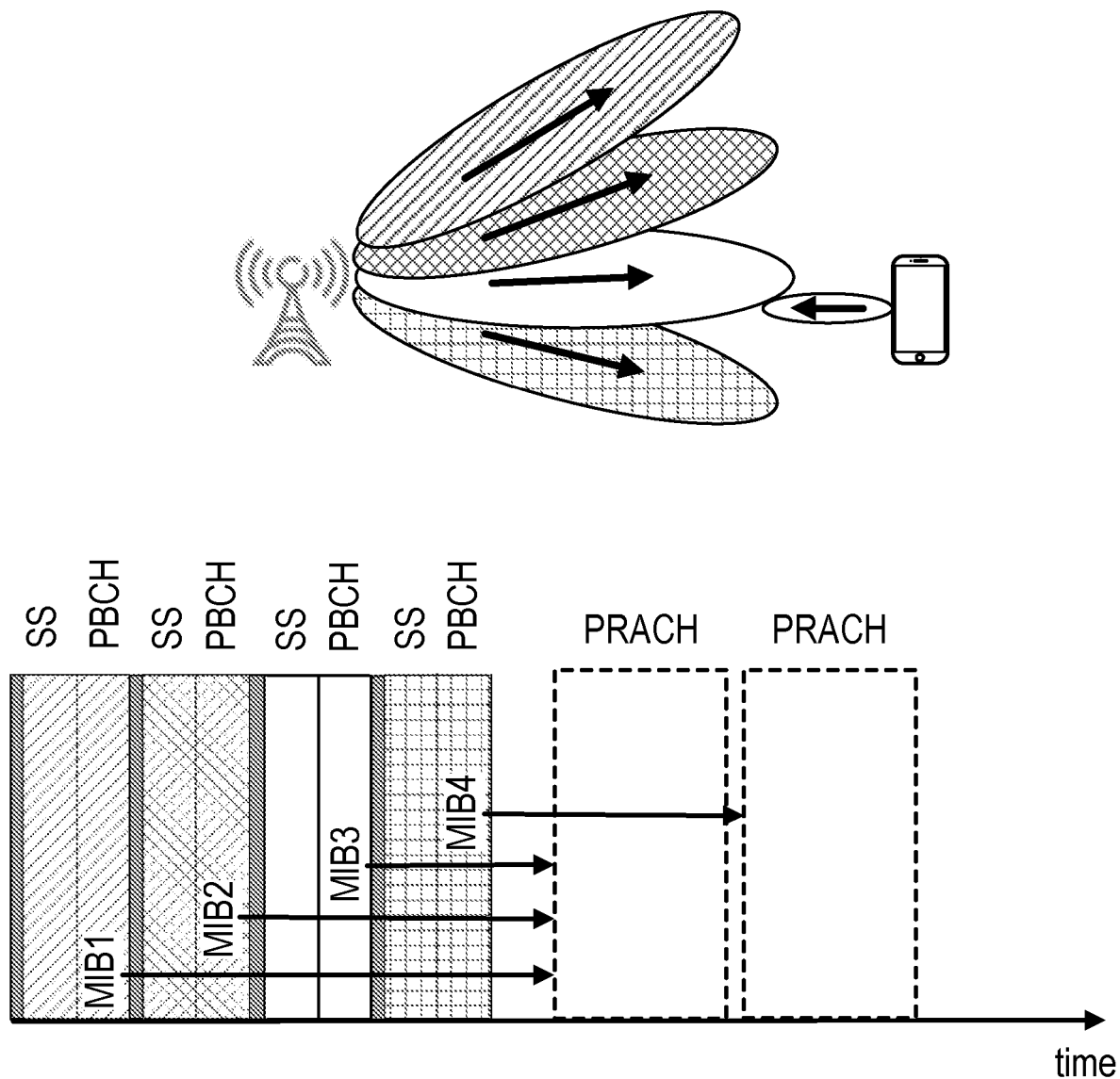
FIG. 2 illustrates an example relationship between synchronization signals (SS), MIB and PRACH resources, with dynamic timing between SS and PRACH.
Figure 3:
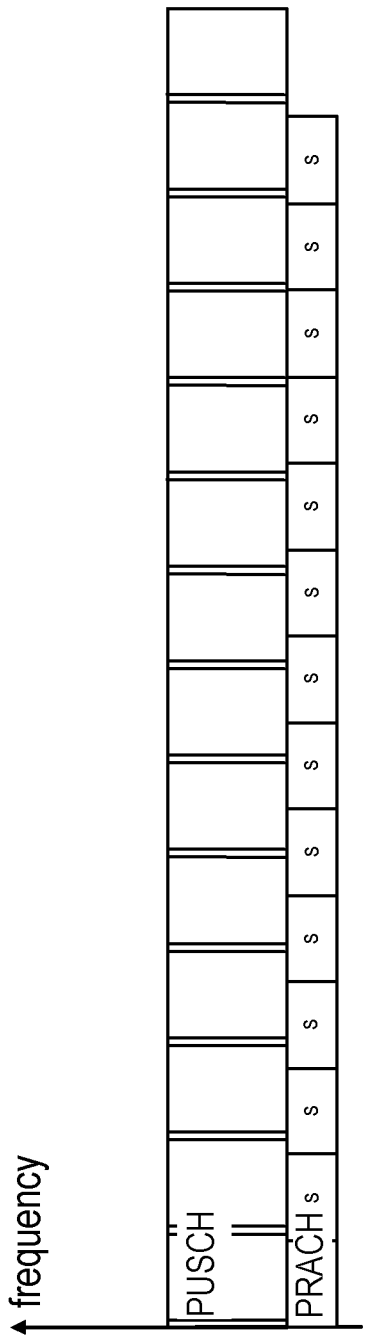
FIG. 3 illustrates an example PRACH preamble format and PUSCH data channel.
Figure 4:
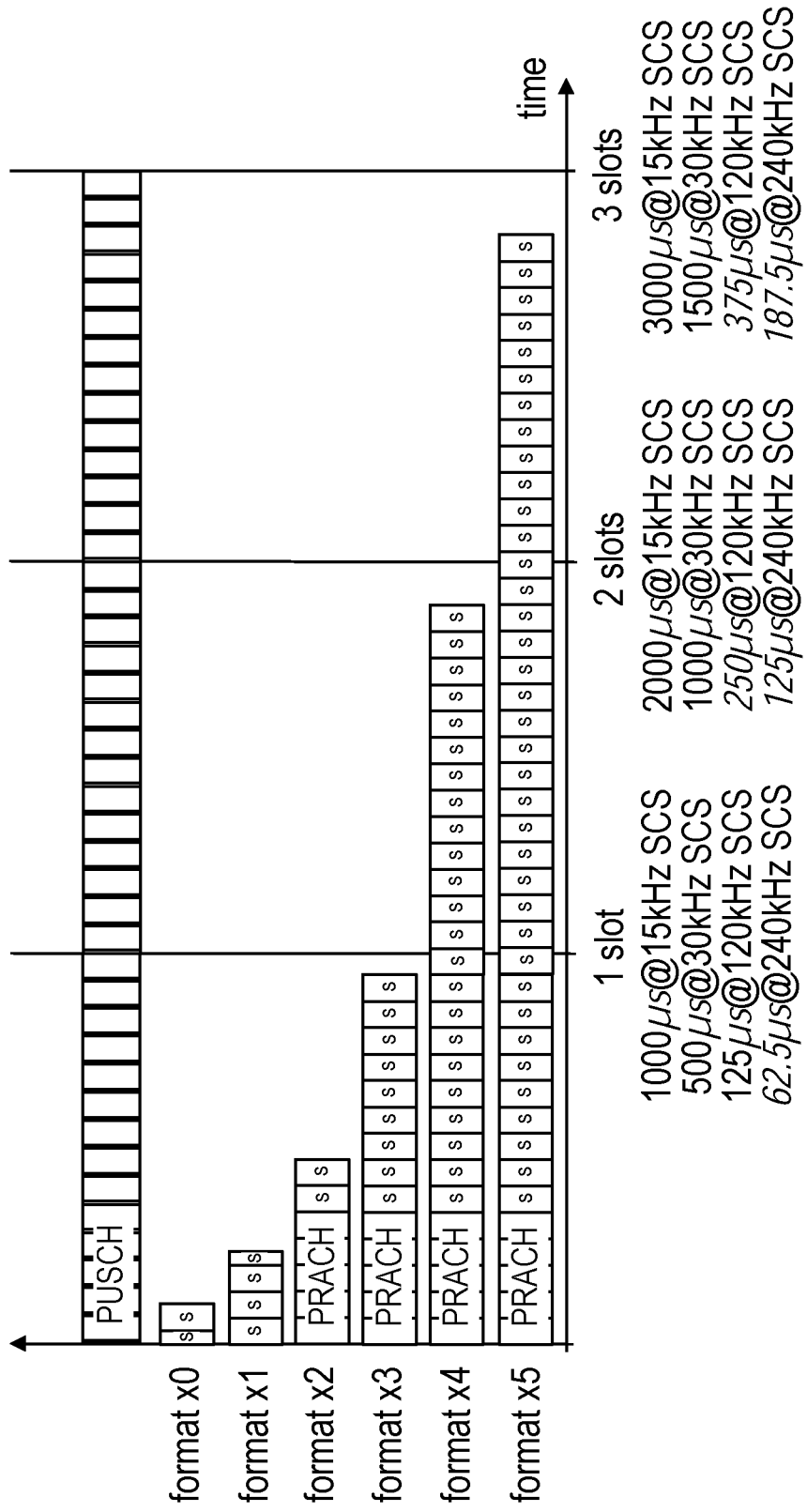
FIG. 4 illustrates six example PRACH preamble formats, with rescaling according to sub-carrier spacing.

Embodiments of several techniques and devices are described in detail below, with much of the detailed description being presented from the perspective of NR, and/or using terminology used by 3GPP to describe LTE and/or NR. It will be appreciated, however, that the inventive techniques and devices described herein may be applied to other wireless communication technologies having similar designs and/or constraints with respect to random access procedures. It will be similarly appreciated that much of the specific terminology and the abbreviations used herein are illustrative, and not limiting—future document for NR, for example, may use different terminology and/or abbreviations to refer to the same or similar things, as may documentation for other wireless communications networks.

As discussed in the background section above, NR may support several PRACH preamble lengths, some of which are less than a slot in length. A slot, in at least some embodiments, is the smallest interval used for data transmissions by the wireless device, e.g., on the PUSCH or comparable channel. A slot may be, for example, 14 OFDM symbols in length. A question that arises from the availability of these short formats is how to efficiently configure those short PRACH preambles that only utilize a fraction of a slot (e.g., with a slot of 14 PUSCH OFDM symbols). There will be a large overhead if, for example, the PRACH preambles that only use one-fourth of a slot are always transmitted at the beginning of the slot.

As discussed in further detail below, this overhead may be reduced by creating the preambles available for use by a wireless device by defining a set of preamble configurations where each preamble configuration comprises a combination of one of several cyclic shifts of a base (or "root") sequence with one of several possible starting positions within the slot that is used for the preamble transmission (e.g., with four different positions if the PRACH preamble use one-quarter of a slot), where the root sequence, the several cyclic shifts, and the several possible positions are fixed according to a standard, configured according to higher layer signaling, or a combination of both. When more preamble configurations are needed than can be provided with a single root sequence, given the number of different cyclic shifts and starting positions within the slot, one or more additional root sequences may be used, again in combination with the several cyclic shifts and several starting positions. However, as discussed in further detail below, preamble configurations are advantageously allocated by using all possible combinations of cyclic shifts and starting positions with a single root sequence before moving on to a second root sequence.

According to some embodiments, as discussed in further detail below, the set of N preamble sequences (configurations) in a cell is found by including first, in the order of increasing cyclic shift, all the available cyclic shifts of a base sequence, and secondly, the available starting positions within the slot (or group of slots, in some embodiments), in the order of increasing time shift within a slot. Additional preamble sequences, in case N preambles cannot be generated from a single base sequence, may be obtained by using additional base sequences, e.g., with consecutive indexes, until all the N sequences are found. In some embodiments, the set of N preamble sequences is alternatively found by including first, in the order of increasing time shift within a slot, all the available starting positions within the slot (or group of slots, in some embodiments), and then secondly, the available cyclic shifts of a base sequence, in the order of increasing cyclic shift, with additional base sequences only then being used if necessary. Note that here the term "preamble sequence" refers to a combination of base sequence, cyclic shift of the base sequence, and a starting position. (The term "preamble," when used alone, typically refers to the modulated signal that carries the preamble sequence.) Elsewhere herein, the term "random access preamble configuration" is used to refer to the same combination. Note also that the terms "base sequence" and "root sequence" are used interchangeably herein. Finally, it will be understood that "random access," as used in the terms "random access preamble" and "random access preamble configuration" is a generic, non-standards-specific term, while the corresponding term "PRACH" refers to the specific name given by 3GPP to the channel (the Physical Random Access Channel) used for random access preamble transmissions. Accordingly, while various aspects of the present invention may be described herein using terms such as "PRACH preamble," "PRACH transmission," "PRACH resource," etc., it should be understood that these terms include standards-specific terminology and are used for convenience to refer to non-limiting examples of random access preambles, random access preamble transmissions, random access preamble resources, and the like.

Advantages of the techniques and devices described herein include that the overhead in time and frequency resources may be reduced, as compared to having only one PRACH preamble in each slot and allocating different slots to each preamble. Furthermore, less interference between PRACH preambles is achieved with the time multiplexing described herein, as compared to using many preamble sequences within the same time and frequency resource.

Figure 5:
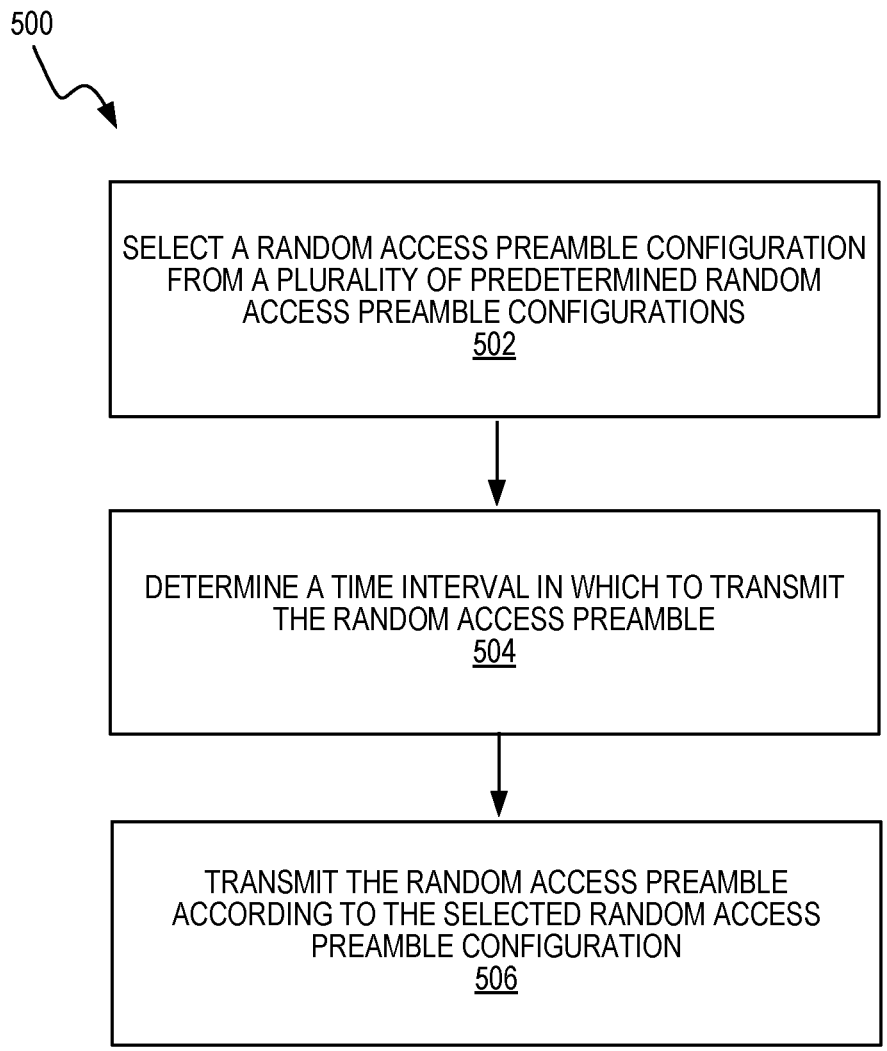
FIG. 5 is a process flow diagram illustrating an example method, according to some embodiments.

FIG. 5 illustrates an example method 500, as implemented in a wireless device such as a UE, for transmitting a random access preamble according to some of the techniques described herein. The method 500 comprises, as shown at block 502, selecting a random access preamble configuration from a plurality of predetermined random access preamble configurations. The method 500 further includes, as shown at block 504, determining a time interval, such as a slot, in which to transmit the random access preamble. It will be appreciated that the steps shown in blocks 502 and 504 can be carried out in any order. The method further comprises, as shown at block 530, transmitting the random access preamble according to the selected random access preamble configuration. As discussed above, each of the plurality of random access preamble configurations comprises a combination of (a) a single root sequence from a predetermined set of one or more root sequences, (b) a single cyclic shift of a predetermined plurality of cyclic shifts for the root sequence, and (c) a single starting position of two or more predetermined starting positions within time intervals allocated for random access preamble transmission.

In some embodiments, the plurality of predetermined random access preamble configurations is defined such that (i) the set of one or more root sequences consists of only a first root sequence, such that the plurality of predetermined random access preamble configurations consists of combinations of the first root sequence with various cyclic shifts and various starting positions, or (ii) the set of one or more root sequences comprises two or more root sequences, and the plurality of predetermined random access preamble configurations comprises all possible combinations of cyclic shifts and starting positions for at least one of the two or more root sequences.

In some embodiments, the set of one or more root sequences consists of only the first root sequence. In some of these embodiments, the plurality of predetermined random access preamble configurations may comprise all possible combinations of the first root sequence with the predetermined plurality of cyclic shifts, but not necessarily all possible combinations of the first root sequence, cyclic shifts, and possible starting positions. In other embodiments where the set of one or more root sequences consists of only the first root sequence, the plurality of predetermined random access preamble configurations may comprise all possible combinations of the first root sequence with the predetermined plurality of starting positions, but not necessarily all possible combinations of the first root sequence, possible starting times, and cyclic shifts. It will be appreciated that these variations correspond to the two preamble sequence allocation processes described above, e.g., in which, according to a first process, the set of N preamble sequences in a cell is found by including first, in the order of increasing cyclic shift, all the available cyclic shifts of a base sequence, and secondly, available starting positions within the slot (or group of slots, in some embodiments), in the order of increasing time shift within a slot, and in which, according to a second process, the set of N preamble sequences is alternatively found by including first, in the order of increasing time shift within a slot, all the available starting positions within the slot (or group of slots, in some embodiments), and then secondly, available cyclic shifts of a base sequence, in the order of increasing cyclic shift.

In some embodiments, the set of one or more root sequences comprises two or more root sequences. In some of these embodiments, the plurality of predetermined random access preamble configurations may comprise all possible combinations of cyclic shifts and starting positions with all but one of the two or more root sequences. These embodiments reflect an orderly allocation approach in which all start positions and all available shifts using a first root sequence are first allocated and, if this does not yield enough preamble configurations, a similar allocation process is applied to one or several additional root sequences, in an orderly manner. For a given root sequence, the available cyclic shifts and starting positions may be allocated such that all available cyclic shifts are allocated, for a given starting position, one starting position at a time. The other order may be applied instead, i.e., such that all available starting positions are allocated, for a given cyclic shift, one cyclic shift at a time. It will be appreciated that either of these approaches may result, depending on the number of preamble configurations that are defined, in one or more combinations of root sequence, cyclic shift, and starting position being unallocated.

Once more than one root sequence is used to define the set of predetermined random access preamble configurations, the cross-correlation properties for the set as a whole are degraded, compared to a set that only uses a single root sequence, and there is thus no further degradation, from a qualitative point of way, resulting from the use of still additional root sequences. In some embodiments where multiple root sequences are invoked, then, the allocation may be performed so as to minimize the total time allocated to preamble transmissions, since there is no longer a benefit to also multiplex in time beyond a minimum possible slot count, as there might be when a single root sequence is invoked.

In some embodiments of the methods described above, the method further comprises determining a length of the random access preamble from two or more predetermined lengths. In some of these embodiments, the two or more predetermined starting positions may then depend on the determined length of the random access preamble.

The set of one or more root sequences may comprise one or more Zadoff-Chu sequences, in some embodiments. In others, the set of one or more root sequences may instead comprise one or more m-sequences. In still others, each root sequence of the set of one or more root sequences is a product of a Zadoff-Chu sequence and an m-sequence.

In some embodiments, each time interval allocated for random access preamble transmission is one slot long, where a slot is the smallest interval used for data transmissions by the wireless device. In some of these or in other embodiments, the length of the random access preamble is at or about one-fourth of a slot, and the two or more predetermined starting positions consist of four starting positions within a slot allocated for random access preamble transmission. In others, the length of the random access preamble is at or about one-half of a slot, and the two or more predetermined starting positions consist of two starting positions within a slot allocated for random access preamble transmission In some embodiments, each time interval allocated for random access preamble transmission comprises two or more slots, where a slot may be, for example, the smallest interval used for data transmissions by the wireless device, as opposed to transmissions of control information. (Alternatively, a slot in some embodiments may correspond to a scheduling interval, but where it is possible for some data transmission to be shorter than a slot.) In some of these embodiments, the two or more predetermined starting positions include starting positions in more than one of the two or more slots.

The determining step of FIG. 5, as illustrated at block 520, may comprise determining a timing from a synchronization signal (SS) to the PRACH resource, i.e., to the time interval in which the random access preamble is to be transmitted. This timing can be indicated in the Master Information Block (MIB), for example, or in the SS itself, in various embodiments. Different SS can then be used for different timings, such that the detected sequence within SS gives the PRACH resource timing. In some embodiments, the determined timing may comprise a timing from a SS or other reference point in a received signal to a group of several time intervals allocated for preamble transmission, with this group comprising a consecutive set of time intervals or some predetermined or pre-configured pattern of time intervals. It will be appreciated that this determined timing from the SS to the PRACH resource indicates a timing reference point, relative to the time interval in which the preamble is to be transmitted. This timing reference point may indicate the beginning of the time interval in which the preamble is to be transmitted, for example, but of course other reference points may be used, so long as network-side nodes and wireless devices have a common understanding. It will be further appreciated that the length of the time interval is a separate parameter, and typically specified in industry standards for the system. For instance, as discussed elsewhere herein, this time interval may correspond to an industry-standard-defined "slot" that is the smallest unit of time allocated to data transmissions, or to two or more of these slots. In systems where this time interval may vary from time to time, the length of the interval, e.g., the number of slots in the time interval, may be indicated to wireless devices by network signaling.

Figure 6:
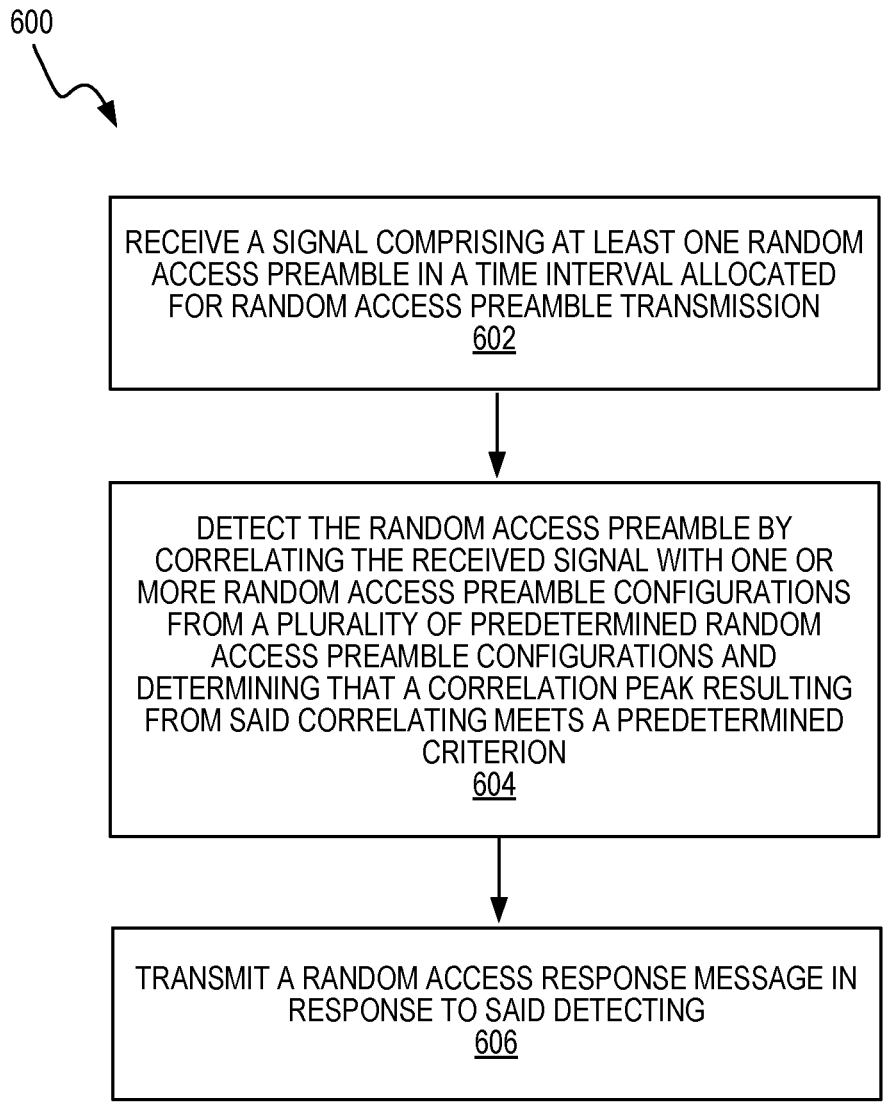
FIG. 6 is a process flow diagram illustrating another example method, according to some embodiments.

While FIG. 5 illustrated an example selection and transmission of a random access preamble, FIG. 6 illustrates a method 600, as implemented in a wireless device, for receiving and detecting a random access preamble. The method 600 of FIG. 6 may be implemented, for example, in a base station, which may in some cases be referred to as an eNodeB, eNB, gNodeB, gNB, or the like.

As shown at block 610, the method 600 of FIG. 6 includes receiving a signal comprising at least one random access preamble in a time interval allocated for random access preamble transmission. As shown at block 620, the method 600 further includes detecting the random access preamble by correlating the received signal with one or more random access preamble configurations from a plurality of predetermined random access preamble configurations and determining that a correlation peak resulting from said correlating meets a predetermined criterion. Finally, as shown at block 630, the method 600 comprises transmitting a random access response message in response to said detecting.

In the illustrated method 600, each of the plurality of random access preamble configurations comprises a combination of (a) a single root sequence from a predetermined set of one or more root sequences, (b) a single cyclic shift of a predetermined plurality of cyclic shifts for the root sequence, and (c) a single starting position of two or more predetermined starting positions within each time interval allocated for random access preamble transmission. In some embodiments, the plurality of predetermined random access preamble configurations is defined such that: (i) the set of one or more root sequences consists of only a first root sequence, such that the plurality of predetermined random access preamble configurations consists of combinations of the first root sequence with various cyclic shifts and various starting positions, or (ii) the set of one or more root sequences comprises two or more root sequences, and the plurality of predetermined random access preamble configurations comprises all possible combinations of cyclic shifts and starting positions for at least one of the two or more root sequences.

As was the case with the complementary method 500 shown in FIG. 5, in some embodiments of the method 600 of FIG. 6, the set of one or more root sequences consists of only the first root sequence. In some of these embodiments, the plurality of predetermined random access preamble configurations may comprise all possible combinations of the first root sequence with the predetermined plurality of cyclic shifts, but not necessarily all possible combinations of the first root sequence, cyclic shifts, and possible starting positions. In other embodiments where the set of one or more root sequences consists of only the first root sequence, the plurality of predetermined random access preamble configurations may comprise all possible combinations of the first root sequence with the predetermined plurality of starting positions, but not necessarily all possible combinations of the first root sequence, possible starting times, and cyclic shifts. Again, it will be appreciated that these variations correspond to the two preamble sequence allocation processes described above, e.g., in which, according to a first process, the set of N preamble sequences in a cell is found by including first, in the order of increasing cyclic shift, all the available cyclic shifts of a base sequence, and secondly, available starting positions within the slot (or group of slots, in some embodiments), in the order of increasing time shift within a slot, and in which, according to a second process, the set of N preamble sequences is alternatively found by including first, in the order of increasing time shift within a slot, all the available starting positions within the slot (or group of slots, in some embodiments), and then secondly, available cyclic shifts of a base sequence, in the order of increasing cyclic shift.

Likewise, in some embodiments, the set of one or more root sequences comprises two or more root sequences. In some of these embodiments, the plurality of predetermined random access preamble configurations may comprise all possible combinations of cyclic shifts and starting positions with all but one of the two or more root sequences. These embodiments reflect an orderly allocation approach in which all start positions and all available shifts using a first root sequence are first allocated and, if this does not yield enough preamble configurations, a similar allocation process is applied to one or several additional root sequences, in an orderly manner. For a given root sequence, the available cyclic shifts and starting positions may be allocated such that all available cyclic shifts are allocated, for a given starting position, one starting position at a time. The other order may be applied instead, i.e., such that all available starting positions are allocated, for a given cyclic shift, one cyclic shift at a time. It will be appreciated that either of these approaches may result, depending on the number of preamble configurations that are defined, in one or more combinations of root sequence, cyclic shift, and starting position being unallocated.

In some embodiments of the method shown in FIG. 6, a length of the random access preamble is selected from two or more predetermined lengths, in which case the two or more predetermined starting positions depend on the determined length of the random access preamble. In some embodiments, the set of one or more root sequences comprises one or more Zadoff-Chu sequences, while in others, the set of one or more root sequences comprises one or more m-sequences. In still others, each root sequence of the set of one or more root sequences is a product of a Zadoff-Chu sequence and an m-sequence.

In some embodiments of the method of FIG. 6, the receiving, detecting, and transmitting is carried out for each of a plurality of time intervals allocated for random access preamble transmission, each of the plurality of time intervals allocated for random access preamble being one slot long, where a slot is the smallest interval used for data transmissions received by the wireless device.

In some embodiments, the length of the random access preamble is at or about one-fourth of a slot, and the two or more predetermined starting positions consist of four starting positions within a slot allocated for random access preamble transmission. In others, the length of the random access preamble is at or about one-half of a slot, and the two or more predetermined starting positions consist of two starting positions within a slot allocated for random access preamble transmission. As was the case with the method of FIG. 5, in some embodiments, the time intervals allocated for random access preamble transmission each comprise two or more slots, where a slot is the smallest interval used for data transmissions by the wireless device, and where the two or more predetermined starting positions include starting positions in more than one of the two or more slots.

Figure 7:
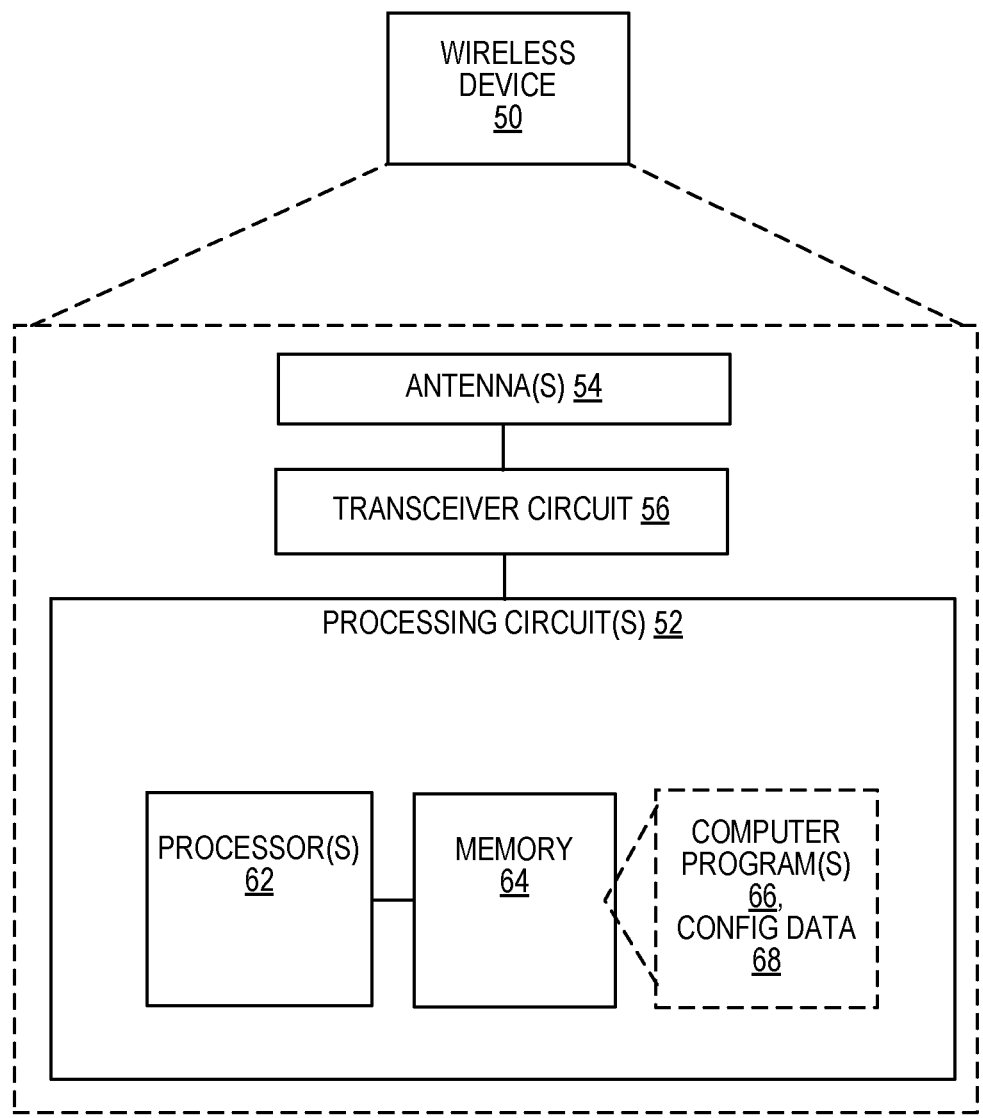
FIG. 7 is a block diagram illustrating an example wireless device according to some embodiments.

FIG. 7 is a block diagram illustrating components of an example wireless device 50, which, in various embodiments may be configured to carry out one or more of the methods described above. In some embodiments, wireless device 50 may be a UE, for example, while in other embodiments wireless device 50 may instead be a base station or other access node.

Wireless device 50 comprises a transceiver circuit 56 and one or more antennas 54. In embodiments where the wireless device 50 is a UE, for example, the wireless device 50 is configured, e.g., with appropriate programming of processing circuits 52, to communicate with a radio node or base station, using transceiver circuit 56 and antenna(s) 54. Likewise, in embodiments where the wireless device is a base station or other access node, the wireless device 50 is configured, e.g., with appropriate programming of processing circuits 52, to use transceiver circuit 56 and antenna(s) 54 to communicate with one or more UEs or other wireless devices.

Transceiver circuit 56 may include transmitter circuits, receiver circuits, and associated control circuits that are collectively configured to transmit and receive signals according to one or more radio access technologies, for the purposes of providing cellular communication services. According to various embodiments, cellular communication services may be operated according to any one or more of the 3GPP cellular standards, GSM, GPRS, WCDMA, HSDPA, LTE, LTE-Advanced and NR.

Whether a UE or a base station, wireless device 50 includes one or more processing circuits 52 that are operatively associated with the radio transceiver circuit 56. The processing circuit 52 comprises one or more digital processing circuits, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, the processing circuit 52 may comprise fixed circuitry, or programmable circuitry that is specially adapted via the execution of program instructions implementing the functionality taught herein, or may comprise some mix of fixed and programmed circuitry.

The processing circuit 52 also includes a memory 64. The memory 64, in some embodiments, stores one or more computer programs 66 and, optionally, configuration data 68. The memory 64 provides non-transitory storage for the computer program 66 and it may comprise one or more types of computer-readable media, such as disk storage, solid-state memory storage, or any mix thereof. By way of non-limiting example, the memory 64 comprises any one or more of SRAM, DRAM, EEPROM, and FLASH memory, which may be in the processing circuit 52 and/or separate from processing circuit 52. In general, the memory 64 comprises one or more types of computer-readable storage media providing non-transitory storage of the computer program 66 and any configuration data 68 used by the wireless device 50.

In some embodiments, the processor 62 of the processing circuit 52 may execute a computer program 66 stored in the memory 64 that configures the processor 62 of a wireless device, such as wireless device 50, to perform one or more of the methods described herein. Some or all of the method may be performed by digital logic or hard-coded circuitry, in some embodiments. The processing circuit 52 may thereby be configured to carry out a method for transmitting a random access preamble according to any of the techniques described herein, for example. Similarly, the processing circuit 52 may be configured to carry out a method for receiving and detecting a random access preamble according to any of the techniques described herein.

Figure 8:
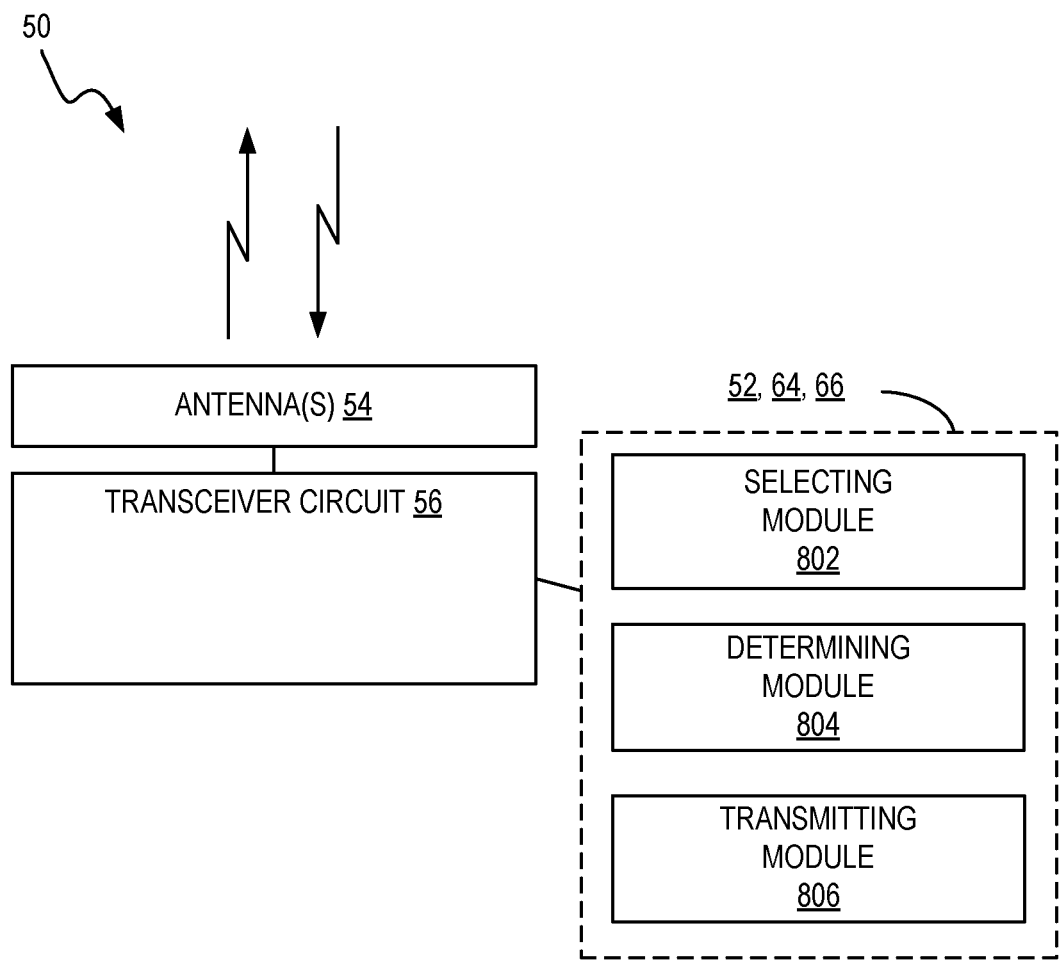
FIG. 8 is a block diagram illustrating a functional implementation of the wireless device according to some embodiments.
Figure 9:
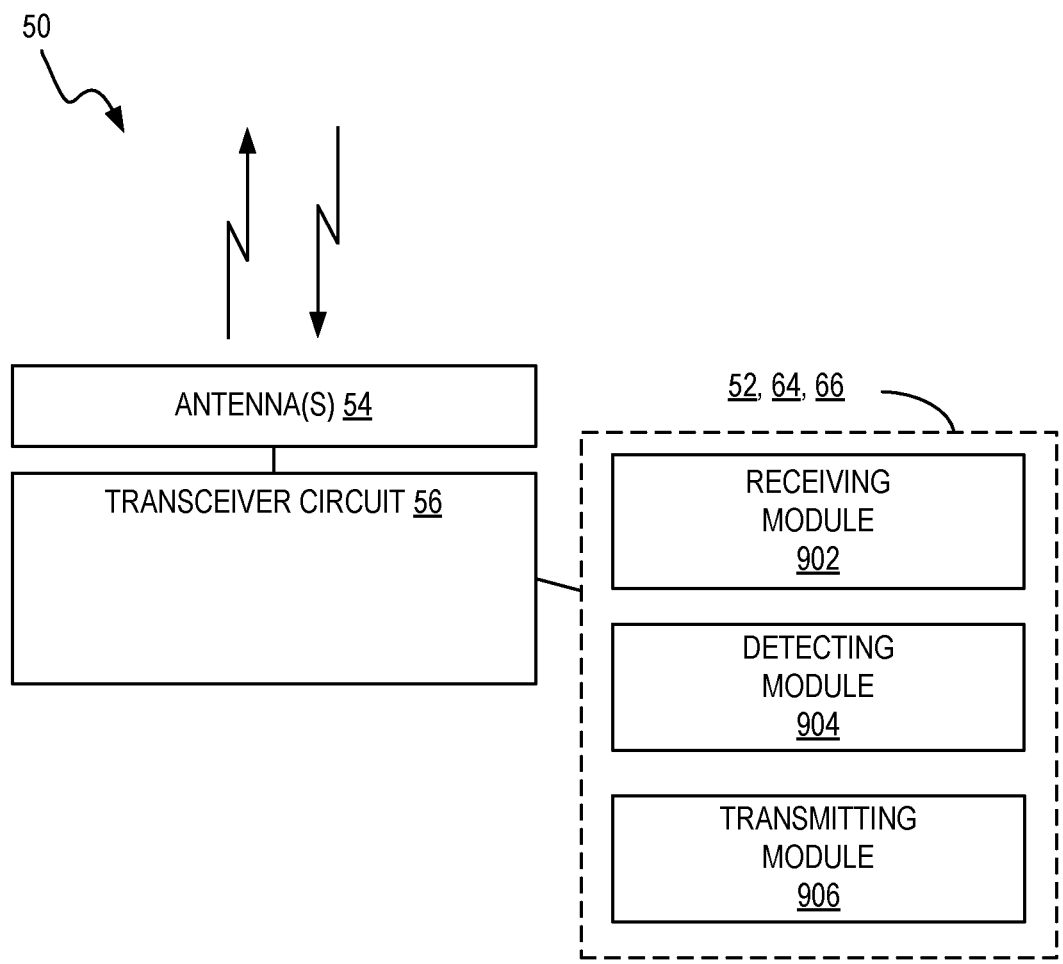
FIG. 9 is a block diagram illustrating another functional implementation of the wireless device according to some embodiments.

It will be appreciated that the wireless device 50 shown in FIG. 7 may also be represented in functional terms, where the functionality of a method like that shown in FIG. 5 or FIG. 6 is carried out by functional modules, the functional modules comprising software modules for execution by a processor circuit, digital logic circuits, or some combination thereof. Thus, for example, a wireless device adapted for transmitting a random access preamble may comprise, as shown in FIG. 8, a selecting module 802 for selecting a random access preamble configuration from a plurality of predetermined random access preamble configurations, a determining module 804 for determining a time interval in which to transmit the random access preamble, and a transmitting module 806 for transmitting the random access preamble according to the selected random access preamble configuration, where each of the plurality of random access preamble configurations comprises a combination of (a) a single root sequence from a predetermined set of one or more root sequences, (b) a single cyclic shift of a predetermined plurality of cyclic shifts for the root sequence, and (c) a single starting position of two or more predetermined starting positions within time intervals allocated for random access preamble transmission. Similarly, a wireless device adapted for receiving and detecting a random access preamble may comprise, as shown in FIG. 9, a receiving module 902 for receiving a signal comprising at least one random access preamble in a time interval allocated for random access preamble transmission, a detecting module 904 for detecting the random access preamble by correlating the received signal with one or more random access preamble configurations from a plurality of predetermined random access preamble configurations and determining that a correlation peak resulting from said correlating meets a predetermined criterion, and a transmitting module 906 for transmitting a random access response message in response to said detecting, where each of the plurality of random access preamble configurations comprises a combination of (a) a single root sequence from a predetermined set of one or more root sequences, (b) a single cyclic shift of a predetermined plurality of cyclic shifts for the root sequence, and (c) a single starting position of two or more predetermined starting positions within the time interval allocated for random access preamble transmission. These wireless devices, like the other wireless devices described herein, may be adapted to carry out one or more of any of the several variations of the methods described herein, including the several variations described in connection with the methods 500, 600 of FIGS. 5 and 6.

Still other embodiments of the presently disclosed techniques and devices include computer program products comprising program instructions configured for execution by a processor of a wireless device, where the program instructions are configured so as to cause the wireless device to carry out a method according to any of the methods described herein. Similarly, other embodiments include a carrier comprising such a computer program product, the carrier comprising at least one of an electronic signal, a radio signal, an optical signal, and a computer-readable medium. The computer-readable medium may be a non-transitory computer-readable medium, for example.

In some embodiments of the methods and devices descried above, the preamble sequence is an m-sequence, where additional preamble sequences are created by different time intervals of a long m-sequence. In other embodiments, the preamble sequences are each a product of an m-sequence and a Zadoff-Chu sequence.

Above, various embodiments have been described using the time unit of one slot as the time interval to be used by PRACH transmissions from the cell, in which the N (e.g. 64) preamble sequences are to be allocated. However, the techniques may be applied to other time interval definitions as well. For example, the network may allocate multiple (e.g., 2) slots for PRACH preamble transmission, e.g., if the data load is low while PRACH load is high. Such allocation reduces the need for using multiple root sequences, thus reducing interference due to imperfect cross-correlation properties. In another case, only a part of the slot (e.g., a half-slot) may be used, creating effective Time-Division Multiplexing (TDM) between neighbor cells' PRACH transmissions, again to reduce interference. Similar reasoning may be applied to configurations with long preambles whose length exceeds one slot; the allocation time interval may thus be different from a single slot or the preamble length.

The above description may thus be interpreted more generally by reading "preamble scheduling interval" or "time interval allocated for RA preamble transmission" instead of "slot."

Physical Random Access Channel

A formalized description of physical random access channel and random access preamble structures and techniques is presented below. It should be understood, however, that variations of the described structures and techniques are possible, e.g., as according to the more generalized methods and devices described above.

Time and Frequency Structure

The physical layer random access preamble consists of a sequence of repeated PRACH OFDM symbols of total duration $T_{SEQ}$ according to Table 1 below, where $T_{s,RA}=1/(\Delta f_{RA} \cdot 2048)$, and where $\Delta f_{RA}$ is the subcarrier spacing for the random access preamble according to Table 1. The parameter values are listed in Table 1 and Table 2 and depend on the random access configuration. Higher layers control the preamble format.

TABLE 1

Random access preamble subcarrier spacing

| Preamble format | $\Delta f_{RA}$ [Hz] |
|---|---|
| A0-A5 | 15 000 |
| B0-B5 | 30 000 |
| C0-C5 | 120 000 |
| D0-D5 | 240 000 |

TABLE 2

Lengths of PRACH preambles

| Preamble format | $T_{SEQ}$ |
|---|---|
| A0, B0, C0, D0 | $(144 + 2048) \cdot T_{s,RA}$ |
| A1, B1, C1, D1 | $3.5 \cdot 2048 \cdot T_{s,RA}$ |
| A2, B2, C2, D2 | $7 \cdot 2048 \cdot T_{s,RA}$ |
| A3, B3, C3, D3 | $14 \cdot 2048 \cdot T_{s,RA}$ |
| A4, B4, C4, D4 | $28 \cdot 2048 \cdot T_{s,RA}$ |
| A5, B5, C5, D5 | $42 \cdot 2048 \cdot T_{s,RA}$ |

The transmission of a random access preamble, if triggered by the Medium Access Control (MAC) layer, is restricted to certain time and frequency resources. A combination of frequency interval, timing interval, and sequence identify a random access preamble. The frequency interval is characterized by a subband index $n_{sub,RA}$ and the timing interval is characterized by time indices $n_{slot,RA}$ and $n_{start,RA}=0, \ldots, N_{slot,RA}-1$ where $N_{slot,RA}$ is given by Table 3.

TABLE 3

$N_{slot,RA}$ for configuration

| Preamble format | $N_{slot,RA}$ |
|---|---|
| A0, B0, C0, D0 | 14 |
| A1, B1, C1, D1 | 4 |
| A2, B2, C2, D2 | 2 |
| A3, B3, C3, D3 | 1 |
| A4, B4, C4, D4 | 1 |
| A5, B5, C5, D5 | 1 |

Each random access preamble occupies a bandwidth corresponding to 6 consecutive resource blocks.

Preamble Sequence Generation

The random access preambles are generated from Zadoff-Chu sequences with zero correlation zone, generated from one or several root Zadoff-Chu sequences.

There are N preambles available in each cell, where N may equal 64, in some embodiments.

In some embodiments, the set of N preamble sequences in a cell is found by including first, in the order of increasing cyclic shift, all the available cyclic shifts of a root Zadoff-Chu sequence with the index $u_{start}$ given by higher layers, and secondly in the order of increasing time shift within a slot by $n_{start,RA}=0, \ldots, N_{slot,RA}-1$.

In other embodiments, the preamble sequences in a cell is found by including first, in the order of increasing time shift within a slot by $n_{start,RA}=0, \ldots, N_{slot,RA}-1$, and secondly in the order of increasing cyclic shift, all the available cyclic shifts of a root Zadoff-Chu sequence with the index $u_{start}$ given by higher layers.

In some embodiments, a preamble base sequence is defined as a Zadoff-Chu root sequence. In the event that N preamble sequences cannot be generated from a single root Zadoff-Chu sequence, additional preamble sequences are obtained from the root sequences with consecutive indexes until all the N preamble sequences are found. The root sequence order is cyclic: the index 1 is consecutive to $N_{ZC}-1$ where $N_{ZC}$ is the length of the Zadoff-Chu sequence.

The $u^{th}$ root Zadoff-Chu sequence is defined by $$x_u(k) = e^{-j\frac{\pi u k(k+1)}{N_{ZC}}}, 0 \leq k \leq N_{ZC} - 1$$

where $N_{ZC}=71$. From the $u^{th}$ root Zadoff-Chu sequence, random access preambles are defined by $$x_{u,v}(k) = x_u(k)e^{j\frac{2\pi v N_{CS} k}{N_{ZC}}},$$

$$\begin{cases} v = 0, 1, \ldots, \lfloor N_{ZC}/N_{CS} \rfloor - 1, & N_{CS} \neq 0 \\ v = 0, & N_{CS} = 0 \end{cases}$$

and $N_{CS}$ is given by Table 4, where the parameter zeroCorrelationZoneConfig is provided by higher layers.

TABLE 4

$N_{CS}$ for preamble generation

| zeroCorrelationZoneConfig | $N_{CS}$ value |
|---|---|
| 0 | 0 |
| 1 | 11 |
| 2 | 14 |
| 3 | 17 |
| 4 | 23 |
| 5 | 35 |

Baseband Signal Generation

The time-continuous random access signal s(t) is defined by $$s(t) = \beta_{PRACH} \sum_{k=0}^{N_{ZC}-1} x_{u,v}(k) \cdot e^{j2\pi(k+k_0)\Delta f_{RA}(t-t_{start}-t_0)}$$

where t=0 at the start of a radio frame, $t_{start}+t_0 \le t < T_{sEQ}+t_{start}+t_0$, and $t_{start}$ is given by $$t_{start}=n_{start,RA}\Delta t_{RA}+n_{slot,RA}\cdot 14\cdot(2048+144)\cdot \Delta T_{s,RA}$$

where $n_{slot,RA}$ is given by higher layers, the values of $\Delta t_{RA}$ depend on the preamble format and the subcarrier spacing as listed in Table 5, and $t_0$ is given by $$t_0=(160-144)\cdot(\lfloor 2t_{start}/T_{sf}\rfloor+1)\cdot T_s$$

where $\lfloor\ \rfloor$ denotes rounding towards nearest lower integer, $T_{sf}=1$ ms, $T_s=1/(15000\times 2048)$ seconds, and $\beta_{PRACH}$ is an amplitude scaling factor in order to conform to the transmit power $P_{PRACH}$. The location in frequency domain is given by the first subcarrier $k_0$ derived from the parameter $n_{sub,RA}$ through $k_0=72n_{sub,RA}-N_{RB}^{(n_{sc},UL)}N_{sc}^{RB}/2$, where $n_{sc}$ is the numerology that fulfills $\Delta f_{RA}=2^{n_{sc}}\cdot 15$ kHz.

TABLE 5

$\Delta t_{RA}$ for preamble generation

| Preamble format | $\Delta t_{RA}$ |
| --- | --- |
| A0, B0, C0, D0 | $(144 + 2048) \cdot T_{s,RA}$ |
| A1, B1, C1, D1 | $3.75 \cdot 2048 \cdot T_{s,RA}$ |
| A2, B2, C2, D2 | $7.5 \cdot 2048 \cdot T_{s,RA}$ |
| Other | 0 |

Advantages of the embodiments disclosed herein include that the overhead in time and frequency resource is reduced as compared to having only one PRACH preamble in each slot, and allocating different slots to each preamble. Furthermore, less interference between PRACH preambles is achieved by time multiplexing as compared to using many preamble sequences within the same time and frequency resource.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method, in a wireless device, for transmitting a random access preamble, the method comprising:
   selecting a random access preamble configuration from a plurality of predetermined random access preamble configurations;
   determining a time interval in which to transmit the random access preamble; and
   transmitting the random access preamble according to the selected random access preamble configuration;
   wherein each of the plurality of random access preamble configurations comprises a combination of a single root sequence from a predetermined set of one or more root sequences, a single cyclic shift of a predetermined plurality of cyclic shifts for the root sequence, and a single starting position of two or more predetermined starting positions within each time interval allocated for random access preamble transmission.

2. The method of claim 1, wherein each of the time intervals allocated for random access preamble transmission is one slot long, where a slot is the smallest interval used for data transmissions by the wireless device.

3. The method of claim 2, wherein the length of the random access preamble is at or about one-fourth of a slot, and wherein the two or more predetermined starting positions consist of four starting positions within a slot allocated for random access preamble transmission.

4. The method of claim 2, wherein the length of the random access preamble is at or about one-half of a slot, and wherein the two or more predetermined starting positions consist of two starting positions within a slot allocated for random access preamble transmission.

5. The method of claim 1, wherein each of the time intervals allocated for random access preamble transmission comprises two or more slots, wherein a slot is the smallest interval used for data transmissions by the wireless device, and wherein the two or more predetermined starting positions include starting positions in more than one of the two or more slots.

6. The method of claim 1, wherein the plurality of predetermined random access preamble configurations is defined such that:
   the set of one or more root sequences consists of only a first root sequence, such that the plurality of predetermined random access preamble configurations consists of combinations of the first root sequence with various cyclic shifts and various starting positions, or
   the set of one or more root sequences comprises two or more root sequences, and the plurality of predetermined random access preamble configurations comprises all possible combinations of cyclic shifts and starting positions for at least one of the two or more root sequences.

7. The method of claim 6, wherein the set of one or more root sequences comprises two or more root sequences and the plurality of predetermined random access preamble configurations comprises all possible combinations of cyclic shifts and starting positions with all but one of the two or more root sequences.

8. The method of claim 6, wherein the set of one or more root sequences consists of only the first root sequence and the plurality of predetermined random access preamble configurations comprises all possible combinations of the first root sequence with the predetermined plurality of cyclic shifts.

9. The method of claim 6, wherein the set of one or more root sequences consists of only the first root sequence and the plurality of predetermined random access preamble configurations comprises all possible combinations of the first root sequence with the predetermined starting positions.

10. The method of claim 1, wherein the method further comprises determining a length of the random access preamble from two or more predetermined lengths, and wherein the two or more predetermined starting positions depend on the determined length of the random access preamble.

11. The method of claim 1, wherein the plurality of random access preamble configurations is determined in an order, wherein the order comprises:
    first, in order of increasing cyclic shift, all available cyclic shifts of the predetermined plurality of cyclic shifts for the root sequence; and
    second, in order of increasing time shift, all available starting positions within one or more slots, wherein a slot is the smallest time interval used for data transmissions by the wireless device.

12. The method of claim 1, wherein the plurality of random access preamble configurations is determined in an order, wherein the order comprises:
- first, in order of increasing time shift, all available starting positions within one or more slots, wherein a slot is the smallest time interval used for data transmissions by the wireless device; and
- second, in order of increasing cyclic shift, all available cyclic shifts of the predetermined plurality of cyclic shifts for the root sequence.

13. The method of claim 12, wherein, for a given root sequence, available cyclic shifts and starting positions are allocated such that all available cyclic shifts are allocated, for a given starting position, one starting position at a time.

14. A method, in a wireless device, for receiving and detecting a random access preamble, the method comprising:
- receiving a signal comprising at least one random access preamble in a time interval allocated for random access preamble transmission;
- detecting the random access preamble by correlating the received signal with one or more random access preamble configurations from a plurality of predetermined random access preamble configurations and determining that a correlation peak resulting from the correlating meets a predetermined criterion; and
- transmitting a random access response message in response to the detecting;
- wherein each of the plurality of random access preamble configurations comprises a combination of a single root sequence from a predetermined set of one or more root sequences, a single cyclic shift of a predetermined plurality of cyclic shifts for the root sequence, and a single starting position of two or more predetermined starting positions within the time interval allocated for random access preamble transmission.

15. The method of claim 14, wherein the plurality of predetermined random access preamble configurations is defined such that:
- the set of one or more root sequences consists of only a first root sequence, such that the plurality of predetermined random access preamble configurations consists of combinations of the first root sequence with various cyclic shifts and various starting positions, or
- the set of one or more root sequences comprises two or more root sequences, and
- the plurality of predetermined random access preamble configurations comprises all possible combinations of cyclic shifts and starting positions for at least one of the two or more root sequences.

16. The method of claim 14, wherein the receiving, detecting, and transmitting is carried out for each of a plurality of time intervals allocated for random access preamble transmission, each of the plurality of time intervals allocated for random access preamble being one slot long, where a slot is the smallest interval used for data transmissions received by the wireless device.

17. The method of claim 14, wherein the plurality of random access preamble configurations is determined in an order, wherein the order comprises:
- first, in order of increasing cyclic shift, all available cyclic shifts of the predetermined plurality of cyclic shifts for the root sequence; and
- second, in order of increasing time shift, all available starting positions within one or more slots, wherein a slot is the smallest time interval used for data transmissions by the wireless device.

18. The method of claim 14, wherein the plurality of random access preamble configurations is determined in an order, wherein the order comprises:
- first, in order of increasing time shift, all available starting positions within one or more slots, wherein a slot is the smallest time interval used for data transmissions by the wireless device; and
- second, in order of increasing cyclic shift, all available cyclic shifts of the predetermined plurality of cyclic shifts for the root sequence.

19. A wireless device comprising a transceiver circuit and a processing circuit operatively coupled to the transceiver circuit, wherein the processing circuit is configured to:
- select a random access preamble configuration from a plurality of predetermined random access preamble configurations;
- determine a time interval in which to transmit the random access preamble; and
- transmit the random access preamble according to the selected random access preamble configuration;
- wherein each of the plurality of random access preamble configurations comprises a combination of a single root sequence from a predetermined set of one or more root sequences, a single cyclic shift of a predetermined plurality of cyclic shifts for the root sequence, and a single starting position of two or more predetermined starting positions within each time interval allocated for random access preamble transmission.

20. A wireless device comprising a transceiver circuit and a processing circuit operatively coupled to the transceiver circuit, wherein the processing circuit is configured to:
- receive a signal comprising at least one random access preamble in a time interval allocated for random access preamble transmission;
- detect the random access preamble by correlating the received signal with one or more random access preamble configurations from a plurality of predetermined random access preamble configurations and determining that a correlation peak resulting from the correlating meets a predetermined criterion; and
- transmit a random access response message in response to the detecting;
- wherein each of the plurality of random access preamble configurations comprises a combination of a single root sequence from a predetermined set of one or more root sequences, a single cyclic shift of a predetermined plurality of cyclic shifts for the root sequence, and a single starting position of two or more predetermined starting positions within the time interval allocated for random access preamble transmission.

* * * * *